United States Patent Office 2,867,605
Patented Jan. 6, 1959

1

2,867,605

THERMOSTABILIZATION OF POLYVINYL CHLO-
RIDE WITH HEAVY METAL CONTAINING ZEO-
LITES

Moyer M. Safford, Schenectady, N. Y., assignor to General Electric Company, a corporation of New York No Drawing. Application March 23, 1955
Serial No. 496,310

5 Claims. (Cl. 260—45.75)

This invention relates to stabilization of polyvinyl resins. More particularly it relates to the thermostabilization of polyvinyl halide resins.

Resinous polymers of vinyl halides including both homopolymers and copolymers are degraded by elevated temperatures. Visual evidence of the degradation is provided by the change in color of the material. In the early stages the resin assumes a light yellow color and continued exposure to the elevated temperature gradually deepens the color until it becomes a dark brown. It is known that the polymers may be stabilized against such degradation by certain compounds of cadmium, barium, lead, strontium or tin or combinations thereof. There is a wide variation, however, in the effectiveness of these materials not only among the various metals but also among the different compounds of the same metal.

It is an object of the present invention to provide very efficient thermal stabilizers for polyvinyl halide resins including both homopolymers and copolymers.

A further object is to provide new and improved thermostabilized polyvinyl halide resins.

A more specific object is to provide new and improved thermostabilized polyvinyl chloride resins.

Still another object is to provide polyvinyl halide resins containing new, improved and very efficient thermostabilizers.

Other objects will appear hereinafter.

It has now been found that the foregoing objects are accomplished by incorporating in polyvinyl halide resins a cation exchange material in which at least a substantial portion of the exchangeable ions are ions of a metal of the group consisting of cadmium, barium, lead, strontium and tin. The polyvinyl halide resins containing these cation exchange materials even in relatively small amounts in terms of the content of the aforesaid metals show excellent thermal stability even in compositions containing plasticizers for the vinyl resins. It is to be understood that the term "polyvinyl halide resins" is used herein to describe both the homopolymers and copolymers of the vinyl halides.

The stabilizing material is readily prepared by the well known ion exchange techniques. According to these techniques the desired metal or metals of the foregoing group are incorporated in the exchanger. If the exchangeable ion in the cation exchanger is not hydrogen it is preferable first to replace it with hydrogen, for example, by treating the exchanger with a suitable acid such as hydrochloric. After most of the exchangeable ions have been replaced by hydrogen, the desired metal ion is then exchanged for the hydrogen ion. Although it is within the scope of the invention to employ any type of cation exchanger, particularly good results have been obtained with the inorganic exchangers, commonly called zeolites.

By way of illustration a quantity of a refined zeolite in powder form which is sold under the trademark "Zeolex" which is a silico-aluminate zeolite sold by the J. M. Huber Corporation, 100 Park Avenue, New York 17, N, Y., and described in their booklet entitled, "Zeolex 20 White Reinforcing Pigment," published April 1953, was treated with one normal hydrochloric acid over a period of two hours. Most of the sodium and calcium ions originally present in the zeolite were removed by this procedure and hydrogen ion was substituted in their places. The zeolite was then washed repeatedly with distilled water, filtered and dried. The dried powder was treated with a one normal lead acetate solution. This mixture was agitated for a short time and then the powder was separated by filtration, washed and dried. Analysis of the resulting zeolite showed that it contained 28.5% of lead.

The invention will be better understood by a consideration of the following examples which are intended as illustrations only, however, and are thus not intended to be construed as limitations.

Example 1

Two grams of the lead containing zeolite powder prepared as described above, were compounded with 38 grams of tricresyl phosphate and 60 grams of the polyvinyl chloride sold under the trademark Geon #101. For comparison a second formulation containing 40 grams of tricresyl phosphate and 60 grams of the same polyvinyl chloride was prepared, omitting the powder. To provide a further comparison still a third formulation was prepared by compounding 2 grams of basic lead carbonate with 40 grams of tricresyl phosphate and 58 grams of the same polyvinyl chloride.

Heat aging tests were run on each formulation. Sheets of each vinyl compound approximately one sixteenth of an inch thick were heated between chromium plate platens in a press for varying times from 5 minutes to 60 minutes at 150° C.

Example 2

Two additional polyvinyl chloride formulations were prepared which were exactly like the first two formulations described in Example 1, respectively, except that in each the tricresyl phosphate used in Example 1 was replaced by an equal weight of dioctyl phthalate. These formulations were given the same heat aging tests given to the formulations of Example 1.

The following table indicates graphically the results of the heat aging tests on the formulations of Examples 1 and 2. As explained above the development of color in the specimen evidences degradation:

| Composition | Minutes heated at 150° C. | | | | |
|---|---|---|---|---|---|
| | 5 | 10 | 15 | 30 | 60 |
| Example 1: 60% polyvinyl chloride, 38% tricresyl phosphate and 2% treated zeolite. | Transparent and no color. | Transparent and very light brown. | Transparent and very light brown. | Transparent and very light brown. | Transparent and light brown. |
| Controls of Example 1— A. No stabilizer | Dark brown and almost opaque. | Dark brown and almost opaque. | Dark brown and almost opaque. | Dark brown and opaque. | Very dark brown and opaque. |
| B. Basic lead carbonate stabilizer. | | | Very light brown but opaque from pigmenting by stabilizer. | Very light brown but opaque from pigmenting by stabilizer. | Light brown but opaque from pigmenting by stabilizer. |
| Example 2: 60% polyvinyl chloride, 38% dioctylphthalate and 2% treated zeolite. | Transparent and no color. | Transparent and no color. | Transparent and no color. | Transparent and no color. | Transparent and very faint color. |
| Control of Example 2— A. Treated zeolite omitted | Transparent and light brown. | Transparent and light brown. | Transparent and light brown. | Transparent and medium brown. | Transparent and medium brown. |

It is apparent from the results of the heat aging tests set forth in the above table that the lead substituted zeolite is a very efficient thermostabilizer for polyvinyl chloride. One of the best known and now widely used thermostabilizers for polyvinyl halide resins is basic lead carbonate. It is generally considered that about 2% of this material is required to give adequate thermostability. That 2% of lead substituted zeolite gives comparable thermostability is very surprising because basic lead carbonate contains about 84% of lead as contrasted with the lead substituted zeolite used in the above examples which contained only about 28.5% lead. It is thus possible to provide adequate thermostability with zeolite with a much smaller quantity of lead than is required when using basic lead carbonate. The undesirability of high lead content in plastics, particularly in articles such as toys, packaging materials and the like, is well known and one advantage of the cation exchanger is therefore obvious.

A further advantage of the lead substituted zeolite stabilizer when compared with basic lead carbonate is apparent from the above table. Whereas the basic lead carbonate even in quantities as low as 2% has a pronounced pigmenting effect on the composition giving it an opaque whiteness, the lead substituted zeolite when added in the same proportion disperses so well that the composition remains transparent and clear and at the same time is substantially as effective as a stabilizer as the equal weight of the lead carbonate. The clarity of the composition containing the lead substituted zeolite is remarkable in view of the fact that the zeolite is a powder.

The above examples detailing the stabilization of polyvinyl chloride with a lead substituted cation exchanger will enable those skilled in the art to apply the invention to exchangers substituted with other of the metals set out above to which the invention applies and to other polyvinyl halide resins. The optimum quantity of stabilizer will vary with differing polyvinyl halide resin compositions and their intended uses as well as with the metal substituted in the cation exchanger and the percentage of substitution. However, in the light of the above examples the appropriate amount of the metal substituted exchanger to employ in a particular composition can be readily determined. Usually the amount will be of the order of 2 percent based on the total weight of the polyvinyl halide resin composition.

It is well known of course that the quantity of metal ion which can be substituted in cation exchangers varies rather widely not only among the different exchangers but also with the different metal ions although in terms of equivalents of metal ion there is little variation among the metals. The quantity of metal substituted in a given quantity of ion exchanger may also be varied by varying the conditions of the substitution. In general, it is preferable to employ as thermostabilizers for polyvinyl halide resins, cation ion exchangers in which the exchangeable ions have been as completely replaced with ions of one of the above described metals as is economically practicable.

In general the thermostabilized polyvinyl halide resin compositions of this invention may be used for the same purposes as polyvinyl halide resin composition thermostabilizers previously known. In addition, however, because of the efficiency and effectiveness of the stabilizers disclosed herein it is possible to provide polyvinyl halide resin compositions with any given level of thermostability which contain less of the thermostabilizing metal than equivalent compositions previously known. This lower metal content will broaden the field of use of many polyvinyl halide resin compositions which have been of limited or questionable desirability in certain uses such as packaging, particularly food packaging, and in toys because of their high toxic metal content.

The advantages of the invention will be apparent from the foregoing description. The invention utilizes very efficient thermostabilizers which are effective in relatively small amounts, in terms of metal content as compared with stabilizers heretofore known, as pointed out above. The advantages of this are indicated in the preceding paragraph which points out that the field of use of the resins is thereby broadened. The stabilizers employed herein also have the advantage that they are relatively expensive and are effective in plasticized compositions. In addition as indicated above the stabilized compositions exhibit a high degree of clarity.

It is apparent that many widely different embodiments of this invention may be made without departing from the spirit and scope thereof and, therefore, it is not intended to be limited except as indicated in the appended claims.

I claim:

1. A thermostable polyvinyl chloride resin composition containing a stabilizing quantity of a silicoaluminate zeolite possessing cation exchange properties and in which at least a substantial portion of the exchangeable ions are ions of a metal of the group consisting of cadmium, barium, lead, strontium and tin.

2. A polyvinyl chloride resin composition containing a stabilizing quantity of a silicoaluminate zeolite possessing cation exchange properties and in which at least a substantial portion of the exchangeable ions are ions of lead.

3. A polyvinyl resin composition as described in claim 2 further characterized in that the lead silicoaluminate zeolite is present in the composition in an amount in the order of 2% by weight based on the total weight of the polyvinyl chloride resin composition.

4. A thermostable polyvinyl chloride resin composition comprising a plasticizer and containing a stabilizing quantity of a silicoaluminate zeolite possessing cation exchange properties and in which at least a substantial portion of the exchangeable ions are ions of a metal of the group consisting of cadmium, barium, lead, strontium and tin.

5. A thermostable polyvinyl chloride resin composition comprising a plasticizer and containing a stabilizing quantity of a silicoaluminate zeolite possessing cation exchange properties and in which at least a substantial portion of the exchangeable ions are ions of lead.

References Cited in the file of this patent

UNITED STATES PATENTS

| | | |
|---|---|---|
| 2,179,973 | Alexander | Nov. 14, 1939 |
| 2,483,960 | Baer | Oct. 4, 1949 |
| 2,627,478 | Bewick et al. | Feb. 3, 1953 |

FOREIGN PATENTS

| | | |
|---|---|---|
| 127,445 | Australia | Apr. 14, 1948 |